Dec. 9, 1958 N. CORDIS 2,863,554
UNITARY OPEN-TOP CHANNEL-TYPE CONVEYOR AND ELEVATOR
Filed Nov. 2, 1953 3 Sheets-Sheet 1
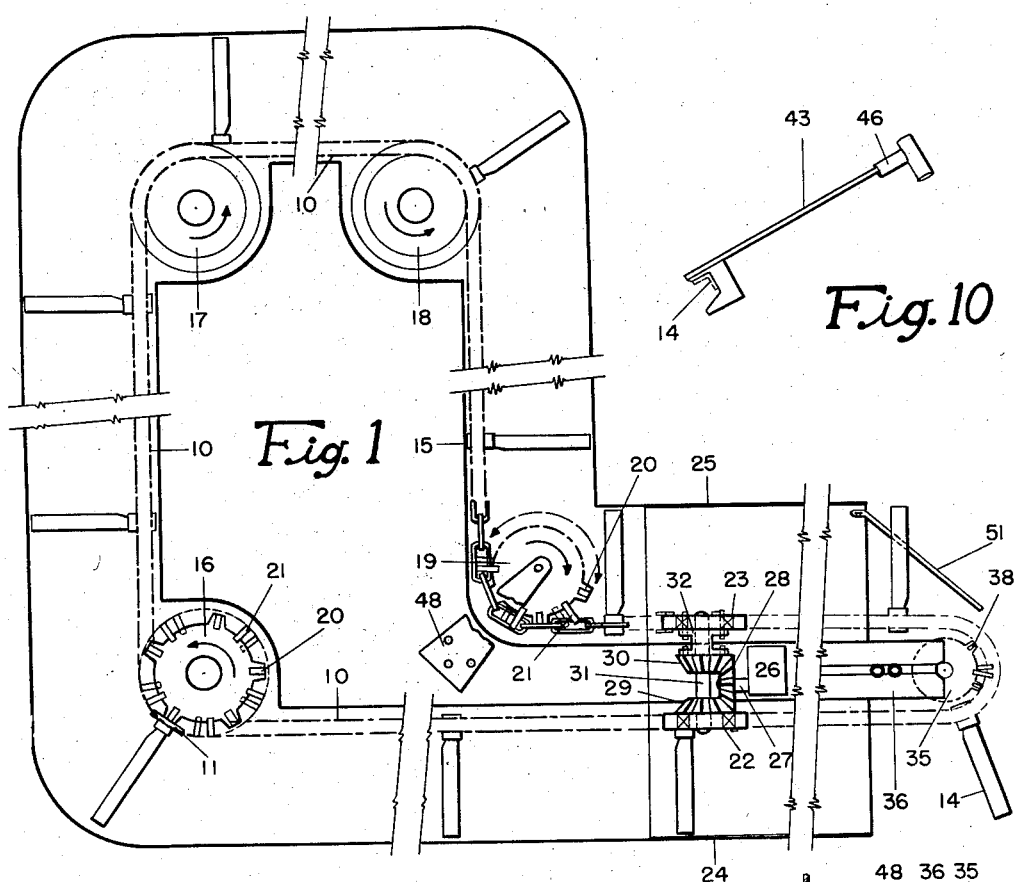
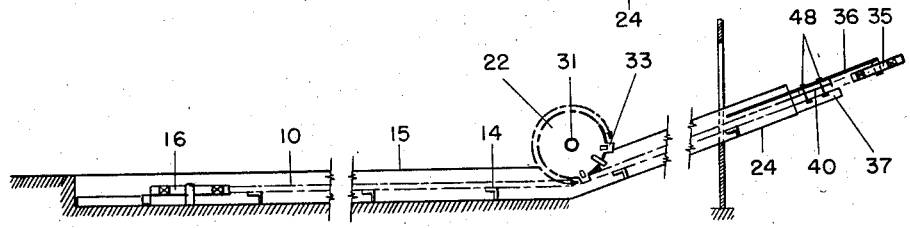
Fig. 2
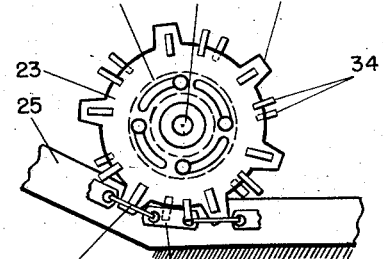
Fig. 3
INVENTOR.
NAT CORDIS
BY Everett A. Johnson
ATTORNEY Dec. 9, 1958 N. CORDIS 2,863,554
UNITARY OPEN-TOP CHANNEL-TYPE CONVEYOR AND ELEVATOR
Filed Nov. 2, 1953 3 Sheets-Sheet 2
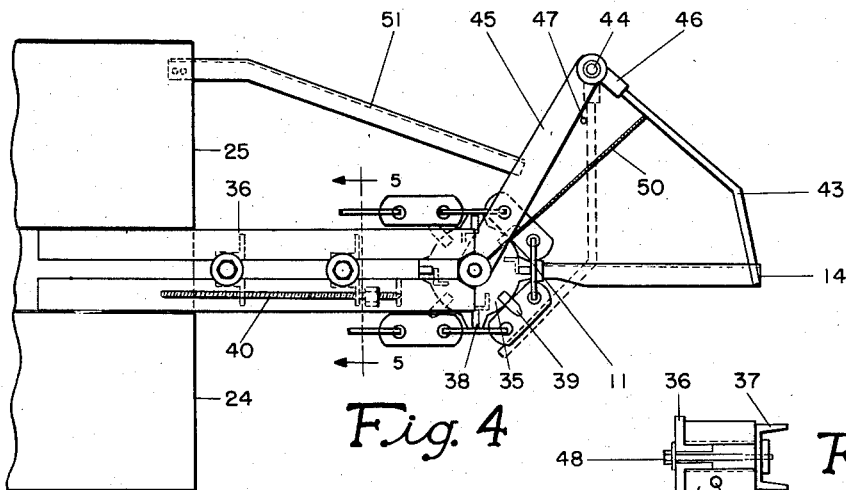
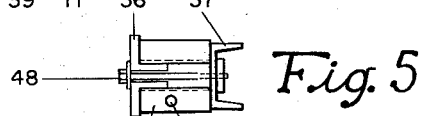
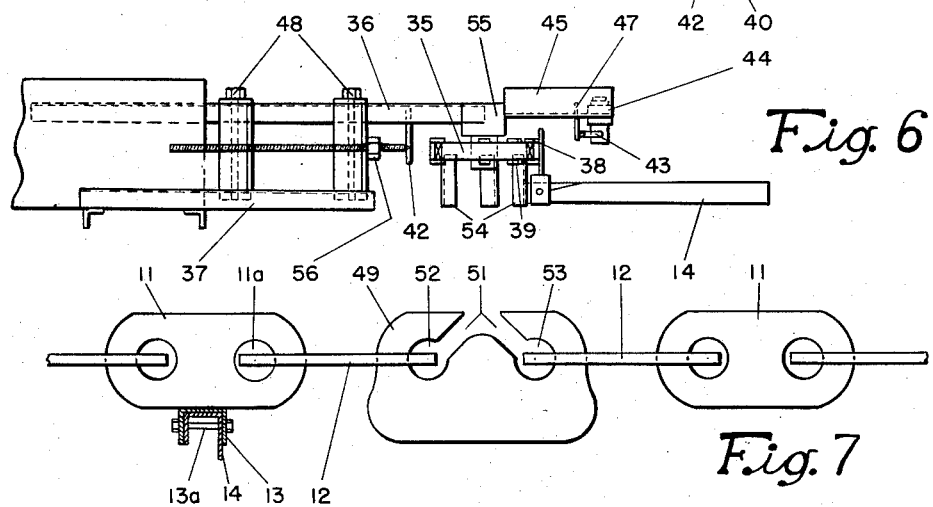
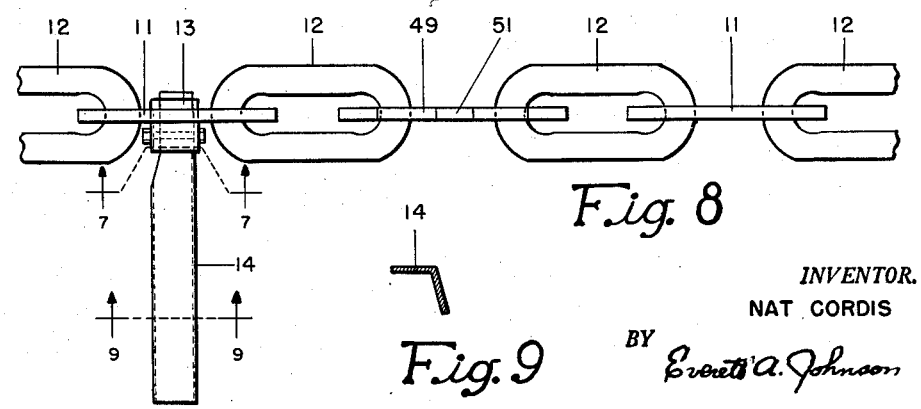
INVENTOR.
NAT CORDIS
BY Everett A. Johnson
ATTORNEY

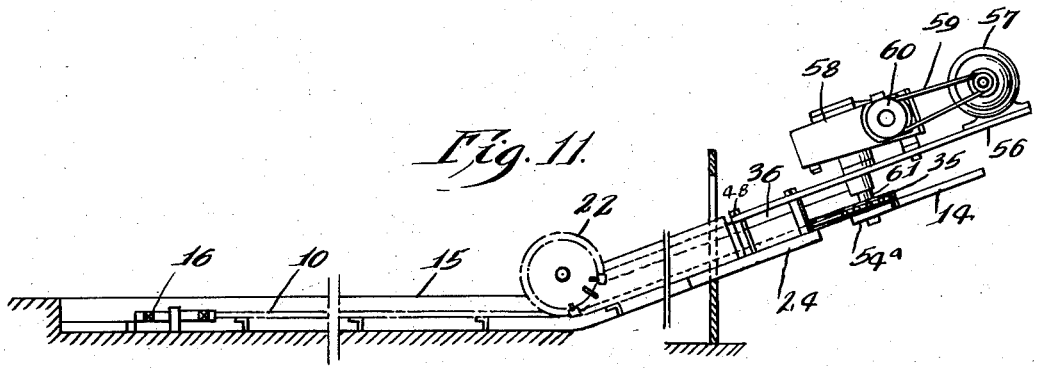
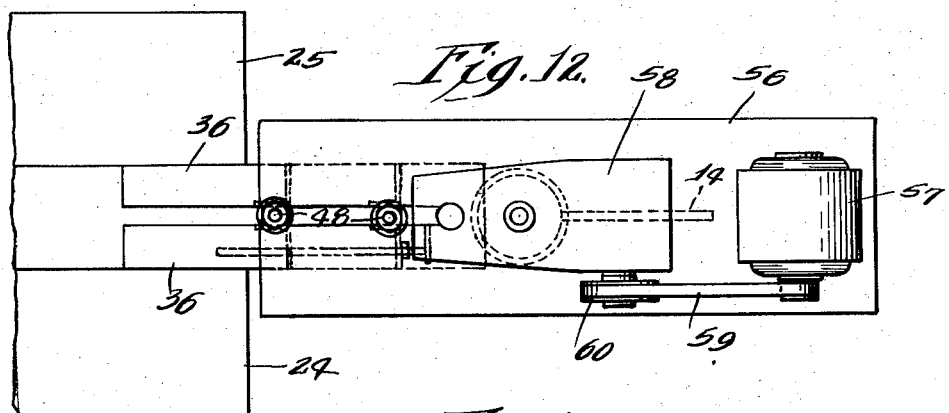
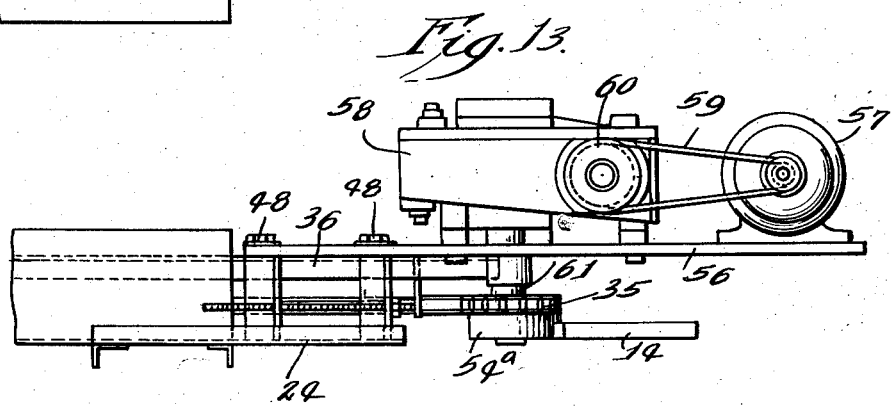

United States Patent Office 2,863,554
Patented Dec. 9, 1958

2,863,554
UNITARY OPEN-TOP CHANNEL-TYPE CONVEYOR AND ELEVATOR

Nat Cordis, Silver Lake, Wis.

Application November 2, 1953, Serial No. 389,717

21 Claims. (Cl. 198—171)

This invention relates to improvements in mechanical barn cleaners and more particularly to a combination trough cleaner and refuse elevator.

Mechanical barn cleaners have contributed greatly to the sanitary and efficient operation of dairy farms where the rapid elimination of refuse is desired. As is well known, the accumulation of refuse may be a source of harmful bacteria and the like. Furthermore, clean barns provide safer and more comfortable places of work for the dairymen. It is therefore, a principal object of a satisfactory barn cleaner that it clean the troughs or gutters rapidly and thoroughly. Another object is to remove the refuse from the barn in an efficient and economic manner.

A barn cleaner of the type to which this invention relates comprises an endless chain having suitable paddles fixed thereto which travel in a gutter in the barn floor and discharges refuse from the barn. Heretofore a pit and a separate conveyor has been provided for elevating refuse discharged from the gutter for loading onto the spreader vehicle. Such arrangements, however, have not been wholly satisfactory.

It is, therefore, a principal object of this invention to provide an improved pitless barn cleaner and conveyor which removes refuse quickly and efficiently and is substantially self-cleaning. Another object of this invention is to provide a combination barn cleaner and conveyor which is durable and which employs one continuous closed chain. A further object is to provide a chain and sprocket system adapted to make right or left hand turns and to be driven from either the top of the chain or the side of the chain. Still another object of the invention is to provide a unitary system having a paddle cleaner at the head of the elevator. Further objects and advantages of my invention will become apparent as the description thereof proceeds.

In general, the invention comprises an endless chain conveyor arranged to travel in a gutter associated with the cattle stalls in a cattle barn as is usual with such arrangements. The chain is arranged to travel over prefabricated sprocket assemblies located above the bottom of the gutter. At intervals the chain is provided with depending blade mounts which may be substantially U-shaped clamps welded to the chain and adapted and arranged to embrace the ends of scraper blades, these scraper blades being arranged to travel over and ride upon the bottom of the gutter. These blades thereby support the chain between the sprockets well above the bottom of the gutter so that the chain will not come into intimate contact with the liquid refuse material within the gutter.

At one point in the gutter system, inclined troughs or continuations of the gutters are provided which extend outwardly and upwardly to provide the bed of an elevator for removing refuse material from the barn. Such elevator may be located at a corner or as a branch of one of the gutters since by my novel chain and sprocket construction it is possible to carry the paddles along the floor of the gutter and elevator and yet make right or left hand turns.

The exterior end of the elevator is adjustable to provide take-up for the chain assembly and at the point of rise a pair of oppositely driven sprockets is provided above the continuous chain. In this manner, the outward flight is driven upwardly within the inclined trough and the return flight is drawn downwardly. The prefabricated gutter sprocket assemblies are fixed in the gutter and the total compensation for wear can be made by adjusting the distance that the idler sprocket at the discharge end of the elevator is disposed from the pair of drive sprockets.

My invention will be better understood by reference to the following detailed description of a preferred embodiment and to the attached drawings forming part thereof wherein like reference numerals indicate corresponding parts in the various figures.

Figures 1 and 2 are diagrammatic representations illustrating the preferred application of my combination barn cleaner and elevator. More specifically, Figure 1 is a top plan view showing a section of a barn floor equipped with one embodiment of my invention for removing refuse therefrom, and Figure 2 is an end elevation of the embodiment in Figure 1 partly in section and with elements removed.

In Figure 3, I have illustrated details of my adjustable drive sprocket illustrated in Figures 1 and 2, the operation of which will be evident from the description hereinafter.

Figures 4 and 6 are top and side views of the discharge end of my conveyor, partly in section and with some parts removed. Figure 5 is a section taken along the line 5—5 in Figure 4.

Figures 7 and 8 are end and top views respectively showing portions of an endless conveyor chain and paddle mounting employed in my invention.

Figure 9 is a section of the paddle taken along the line 9—9 in Figure 8. Figure 10 illustrates the details of a blade cleaner shown in Figure 4.

Figure 11 is an elevation, partly in section, illustrating a modification wherein the drive means is at the head of the elevator.

Figures 12 and 13 are fragmentary top and side views of the discharge end of the conveyor of Figure 11.

Referring to the drawing, the conveyor chain 10 is of a novel construction comprising links 11 and 12. Link 11 consists of a dually-punched plate, the punched openings 11a being adapted to receive links 12. The links 12 are the same length as link 11, but all of the material between the openings 11a has been punched out. To fabricate the chain, the links 12 are cut on one long side and spread apart without deforming either end or the other side of the chain. The open link is then inserted into the eyes 11a of the punched plate link 11 and welded. This produces a chain comprising a series of vertically-disposed links 12 alternately spaced by a series of horizontally-disposed links 11. In the illustrated embodiment, the vertically disposed links 12 consist of the dually-punched plates and the horizontally-disposed links 11 consist of the punched endless links. The maximum internal dimension of the punched continuous link 12 is equal to the distance between the most remote edges of the punched openings 11a in the vertical link 11.

At spaced intervals the chain 10 is provided with depending substantially U-shaped clamps 13 adapted and arranged to hold the ends of the scraper blades 14. These clamps 13 are fixed, as for example by welding, to the vertically-disposed plate link 11 as shown in Figures 3 and 4. The clamps 13 provide a hinge fastening for the scrapers 14. The fixed end of the scraper 14 is formed into a U and has a bolt hole which takes the bolt or hinge pin 13a for fastening to the inverted U-shaped clamp 13 carried by plate link 11. Also, the leading edge of the scraper 14 is formed at an angle to the hole, thereby providing a positive rake on the scraper and forcing the scraper to the bottom of the gutter.

As the chain 10 and scraper blades or paddles 14 travel within the gutter 15, they pass over idler sprockets 16, 17, 18 and reverse turn sprocket 19. These sprockets are of novel construction in that they are provided with stub teeth 20 and spaced guide bars 21. The guide bars 21 extend radially from the faces of the sprockets 16 to 19 and are disposed between the stub teeth 20. In the preferred arrangement, the guide bars are circumferentially displaced from each other and from the teeth 20 for self-cleaning and more foolproof guiding of the endless links 12, the continuous face of the plate link 11 riding on the stub teeth 20.

In the preferred embodiment, the idler sprockets 16, 17 and 18 and the reverse turn corner sprocket 19 are fully prefabricated and may be readily set in the concrete trough and floor by unskilled labor. Reverting to reverse turn sprocket 19, it is suspended within the trough or gutter by the bracket 48, thereby permitting the depending paddles 13 to pass beneath the sprocket 19 and the chain between the sprocket and the gutter wall.

The drive mechanism comprises a pair of sprockets 22 and 23 arranged transverse to the direction of the chain 10 over the elevator. The elevator comprises a pair of inclined parallel chutes 24 and 25 which terminate short of the outward travel of the chain 10 and blades 13. In one embodiment, the power source 26 is applied to shaft 27 which in turn drives bevel gear or pinion 28. Gears 29 and 30 are respectively adapted and arranged to drive sprockets 22 and 23 in opposite directions.

To accomplish this, I may mount the sprockets 22 and 23 in oilite bushings and fix the gears 29 and 30 to the sprockets. In this way the sprockets 22 and 23 can be driven in opposite directions on the single shaft 31. The return drive sprocket 23 is adjustable by interposing flanged hub 32 between the gear 30 and the sprocket 23. The hub 32 is provided with threaded bolt holes and the corresponding bolt holes in the sprocket are circumferentially elongated to provide 360 degree adjustment of the sprocket 23 relative to the driving gear 30.

The drive sprockets 22 and 23 are of somewhat different construction than the idler sprockets 16, 17, 18, and 19 in that the sprocket teeth 33 are adapted to enter the horizontal links 12 and the radial bars 34 guide the vertical links 11. By this general arrangement, the conveyor chain 10 is driven upwardly over the surface of the chute 24 by drive sprocket 22 and drawn downwardly within the return chute 25 by the return drive sprocket 23. The turnaround at the upper end of the elevator comprises an adjustable idler sprocket 35 carried by adjusting bar 36 which is slidably supported in elevator frame member 37. Bolted brackets 48 retain the adjusting bar 36 in the desired position.

In general, the idler turnaround sprocket 35 resembles the idler sprockets 16 to 19, the stub teeth 38 supporting the vertical plate links 11, and the endless links 12 being positioned about the sprocket by radial guide bars 39. The position of idler return sprocket 35 is adjusted by means of the adjusting screw 40, the thrust plate 41 fixed to the elevator frame 37 and the thrust means 42 on bar 36. This adjustment screw 40 may be about eighteen inches long and thereby provide considerable take-up in the conveyor chain 10.

To make the compensation for wear the four bolts holding the return sprocket 23 on hub 32 are removed. The bolted brackets 48 on the adjusting bar 36 for the idler sprocket 35 at the discharge end of the elevator are loosened. The idler sprocket 35 is then moved outwardly by advancing the adjusting bar 36 along the adjusting screw 40 by means of nut 56. This will draw the chain upwardly in chute 25 and since the sprocket 23 is free to turn on its flanged mounting hub 32, the tension in the chain is uniform. Finally, the bolted brackets 48 are tightened and the four hub bolts are replaced in the sprocket 23 and hub 32.

If desired, a movable blade scraping means 43 may be provided at a point beyond the upper limit of the chutes 24 and 25. This blade scraping means 43 may be pivoted at 44 to extension 45 of the adjusting bars 36. A resilient bumper 46 is carried by the scraping means 43 and coacts with pin 47 fixed to extension 45 to restrict the inward movement of the cleaner 43 after the blade 14 has passed on. The blade cleaner 43 is returned to a point near the idler sprocket 35 by spring 50 to engage the next blade 14. This mechanism is shown in Figures 4, 5, and 10.

In passing about idler 35, the fixed ends of blades 14 abut depending guides 54 which are fixed to the lower side of idler 35 and radially aligned with stub teeth 38. These guides prevent the paddles 14 from dropping downward in passing about 35. To guide the paddles from the idler 35 to return chute 25, guide bar 51 may be provided. Incidentally, stub teeth 38 and guide bars 39 of sprocket 35 correspond to stub teeth 20 and guide bars 21, respectively, of idler sprockets 16, 17, 18, and 19.

The above description makes reference to one preferred method of fabricating the links 11 and 12 of the chain 10. In another embodiment, the links 12 can be made by cutting the links across the short dimension, inserting the two alternate punched plates 11, and butt-welding the two segments of the split links 12.

Ordinarily the chain 10 can be prefabricated in conveniently handled lengths and then assembled at the site. This may be done by welding a link 12 in place or a special connecting link 49 may be provided. This connecting link 49 is intended to travel in a vertical plane and to remain in tension between links 12. The connecting link 49 has an inverted V-shaped notch 51 in the upper edge, the lower ends of the notch being undercut at 52 and 53 toward the ends of the link to receive the adjacent horizontal links 12. Inasmuch as means is provided for adjusting the tension in the chain 10, the open connecting links 49 can be inserted where needed and then placed in tension.

Referring to Figures 11, 12, and 13, the head of the elevator 24-25 includes a platform 56 supported by adjustable bars 36 secured by bolts 48. A motor 57 and transmission 58 are mounted on the platform 56, the motor 57 driving the transmission 58 through pulley 60 and belt 59. The transmission in turn drives the sprocket 35 through the drive shaft 61, causing the chain conveyor 10 and paddles 14 to travel up the chute 24, about the sprocket 35 and down the chute 25. In this connection, it will be understood that the paddle cleaner assembly 43 et seq. of Figures 4 and 6 are also employed in the embodiment of Figures 12 and 13 but are omitted from the drawing for convenience. The depending guide 54a engages the inner end of the paddle 14 as shown, thereby holding the paddles in an outward array during the cleaning operation as described above.

Although I have illustrated and described preferred embodiments of my invention, it should be understood that variations and modifications may be made therein without departing from the spirit of the invention. For example, other types of chain constructions are contemplated, including alternate series of vertical and horizontal plate and loop links may be used. Likewise, wooden scrapers may be substituted for the angle iron blades illustrated in the drawings. Accordingly, I do not wish to be limited to the precise details disclosed, but intend to include such modifications and embodiments which will be apparent to those skilled in the art from the above description of my invention.

This application is a continuation-in-part of my co-pending application, Serial No. 79,243, filed March 2, 1949.

What I claim is:

1. A combination barn cleaner and refuse elevator comprising a trough forming an open loop in the barn floor and terminating in substantially parallel inclined chutes aligned with the open ends of said trough loop, an endless chain disposed within said trough and chutes for travel around the loop and around said chutes, a plurality of paddles secured to and extending outwardly from said endless chain across said trough, a place of discharge at the upper end of said inclined parallel chutes, and a motor-driven sprocket mechanism at the junction of the ends of said trough loop onto the inclined parallel chutes engaging said chain to hold the chain within the trough and chutes and for driving said endless chain around said trough loop and around said chutes in succession, said sprocket mechanism including a pair of oppositely rotating sprockets driving parallel flights of chain in said chutes in opposite directions.

2. In a barn cleaner including a trough in the barn floor and an endless chain passing over sprockets rotatable in the plane of the floor and said chain carrying a plurality of spaced paddles extending outwardly therefrom, the improvement which comprises an inclined elevator including a divided chute which is an extension of the trough in said barn floor, an idler sprocket rotatable in the plane of the inclined elevator and located beyond the upper end of said chute, an endless conveyor chain passing through said trough, within said chute and about said idler sprocket, and a pair of oppositely rotating drive sprockets at the lower end of said chute engaging the top of parallel flights of the chain, whereby the chain is held within the chute and trough and driven in succession about said trough and through said divided chute.

3. A combination barn cleaner and elevator conveyor comprising a trough in the barn floor, a conveyor chain within said trough comprising a series of vertically-disposed plates alternately spaced by a series of horizontally-disposed links, a plurality of paddles secured to and extending outwardly from said endless conveyor chain, a plurality of idler sprockets disposed adjacent said trough and adapted to be rotated in the plane of chain travel within said trough, another idler sprocket suspended within the trough and spaced from the bottom thereof to permit the passage of the paddles under the sprocket, and inclined elevator including a pair of substantially parallel chutes, portions of said trough and the lower ends of said chutes being in alignment, an idler take-up sprocket at the upper end of said chutes rotatable in a plane substantially parallel to the bed of said chutes, said take-up sprocket being adjustably mounted, and oppositely rotated drive sprocket means mounted astride said chutes in planes perpendicular to the plane of travel of said chain, each said drive sprocket having means adapted to enter the horizontal links of said chain, and separate means for aligning the vertical plate links of said chain passing under said drive sprockets.

4. A pitless barn cleaner and elevator conveyor comprising a trough in the barn floor, a conveyor chain within said trough comprising a series of vertically-disposed plates alternately spaced by a series of horizontally-disposed links, a plurality of paddles secured to and extending outwardly from some of said plates in said endless conveyor chain, at least three idler sprockets disposed adjacent said trough and adapted to be rotated in the plane of chain travel within said trough, another idler sprocket suspended within the trough and spaced from the bottom thereof to permit the passage of the paddles under the sprocket, an inclined elevator including a pair of substantially parallel chutes, portions of said trough and the lower ends of said chutes being in alignment, an idler take-up sprocket at the upper end of said chutes rotatable in a plane substantially parallel to the bed of said chutes, an adjustable support for said take-up sprocket, a pair of oppositely rotated drive sprockets mounted astride parallel lengths of said chain in planes perpendicular to the plane of travel of said chain, said drive sprockets having means adapted to enter the horizontal links of said chain, and separate means for aligning the vertical plate links of said chain passing under said drive sprockets, and adjustable hub mounting means associated with at least one of said drive sprockets for angular adjustment thereof with respect to said chain links.

5. A pitless barn cleaner and refuse elevator comprising a trough forming an open loop in the barn floor and terminating in substantially parallel chutes aligned with the ends of said open loop, an endless chain disposed within said trough and chutes for travel around the loop and through said parallel chutes, said chain comprising alternate open plate links and closed plates arranged in perpendicular planes and providing a chain adapted to be engaged by sprockets from the top and from the side, a plurality of paddles secured to and extending outwardly from said endless chain across the trough, the upper end of said inclined chutes providing a place of discharge, and a pair of gear driven sprockets rotating in opposite directions and engaging parallel sections of said endless chain in said chutes for driving said endless chain around said loop and through said chutes in succession, said gear-driven sprockets being mounted astride said parallel sections of chain above said chutes and holding down said chain adjacent the floor of said trough and said chutes.

6. In a pitless barn cleaner including a trough forming an open loop in a barn floor and an endless single-strand conveyor chain passing around sprockets rotatable in the plane fo the floor and a plurality of spaced paddles fixed at one end to and extending laterally from said chain, the improvement which comprises an inclined elevator including a longitudinally divided chute having an inlet channel and a return channel aligned with the open ends of said open loop, each of said channels being of the same width as said trough, an idler sprocket rotatable in a plane parallel to the plane of the inclined elevator and located beyond the upper end of said channels to provide a place of discharge, said endless single strand conveyor chain passing through said trough loop, upwardly within said inlet channel, about said idler sprocket, and downwardly through said return channel, and a pair of oppositely rotating axially aligned drive sprockets engaging parallel flights of the said chain, said drive sprockets being mounted astride said parallel flights above said chutes and holding said flights adjacent the floor of said trough and said chutes, whereby the chain is driven up said inlet channel and pulled down said return channel and passed in succession about said trough and around said divided chute through the place of discharge beyond the upper ends of said channels.

7. A combination barn cleaner and elevator conveyor comprising a trough in the barn floor, a conveyor chain within said trough comprising a series of vertically-disposed plates alternately spaced by a series of horizontally-disposed links, a plurality of paddles secured to and extending outwardly from said endless conveyor chain, an inclined elevator including a pair of substantially parallel chutes, portions of said trough and the lower ends of said chutes being in alignment, and drive sprockets means mounted astride said chutes above said chain, said drive sprocket having drive means adapted to enter the horizontal links of said chain and separate means for aligning the vertical plate links of said chain passing under said drive sprockets, and gear means for rotating said sprockets in opposite directions simultaneously while engaging parallel flights of said chain.

8. A pitless barn cleaner and elevator comprising a trough forming an open loop in the barn floor, a conveyor chain within said trough comprising a series of vertically disposed plates alternately spaced by a series of horizontally-disposed links, an inclined elevator including a pair of substantially parallel chutes, the open ends of said trough loop and the lower ends of said chutes being in alignment, a pair of parallel drive sprockets mounted astride parallel lengths of said chain passing over said elevator, said drive sprockets having peripheral projections adapted to enter the horizontal links of said chain and means for aligning the vertical plate links passing under said drive sprockets, gear means for driving said sprockets simultaneously in opposite directions whereby the chain is driven up one of said chutes and pulled down the other, and hub mounting means for at least one of said drive sprockets for angular adjustment thereof while both sprockets are in engagement with said chain.

9. The apparatus of claim 7 wherein said conveyor chain includes spaced vertically-disposed connecting link plates having an inverted V-shaped notch in the upper edge, the lower ends of the notch being undercut toward the ends of the plate to receive adjacent closed loop links comprising the terminal links of a series of horizontally-disposed links alternately spaced by a series of vertically-spaced plates.

10. The apparatus of claim 6 which includes a paddle cleaner means adapted to scrape the paddles as they pass around said idler sprocket, said paddle cleaner means comprising paddle and guide means below said sprocket to hold the paddles in an extended array, a scraper head adapted to contact the leading face of each successive paddle and to move outwardly therealong, a swingable support arm for said head supporting said head in a plane parallel to the plane of rotation of said idler sprocket, whereby said head travels outwardly along each said paddle beyond the end thereof, and spring means for returning said head adjacent such chain to engage the next succeeding paddle at a point near said chain.

11. A kink-proof conveyor chain comprising spaced vertically-disposed connecting links comprising substantially flat plates and having an inverted V-shaped notch in the upper edge, said notch providing a pair of symmetrical diverging channels extending obliquely downward from said upper edge, the lower ends of the said channels being undercut toward the ends of the plate to receive adjacent closed loop links comprising the terminal links of a series of horizontally-disposed links alternately spaced by a series of vertically-disposed plates, said connecting links having a vertical height substantially greater than the vertical height of said plates and having their upper edges in alignment with the upper edges of said vertically disposed plates.

12. A material handling apparatus of the type having an open top channel with a conveyor traveling therealong in a continuous circuit comprising a series of linear channels connected by non-linear channels, an endless conveyor chain traveling successively along said linear channels and through said non-linear channels, said chain comprising a continuous series of connected links, alternate links lying in planes which are substantially perpendicular to each other, idler means mounted adjacent such non-linear channel on an axis substantially normal to the plane of travel of said chain through said channels for turning movement within said non-linear channels, said chain having material engaging means carried in a substantially horizontal path within said channels and about at least one of said idler means with material engaging means extending radially inward thereof, said chain operatively engaging said idler means for turning said idler means about its axis by the travel of said chain through said non-linear channels whereby the material handled is conveyed in a substantially uniform manner within said linear and non-linear channels.

13. The apparatus of claim 12 wherein said material engaging means are fixed transversely below spaced and correspondingly disposed links.

14. The apparatus of claim 12 including a drive sprocket means having a shaft mounted for rotation on a substantially horizontal axis arranged transverse to the path of chain travel along a linear channel and acting on said chain for advancing it along said series of linear and non-linear channels.

15. The apparatus of claim 14 wherein said chain comprises vertical and horizontal links and the sprocket means embraces the vertical links and is provided with radially extending means for engaging the horizontal links to drive said chain along said channels.

16. In a material handling conveyor system employing an endless chain with material engaging means fixed to spaced links of said chain and extending in a direction generally transverse to the path of chain travel, the improvement which comprises an idler for guiding the path of travel of such chain including a rotatable substantially disc-like element, said element being mounted on an axis arranged substantially perpendicular to a plane parallel to the plane of the path of travel of said chain, and a spaced array of depending pins adjacent but spaced from the periphery of said disc-like element, said pins extending normal to the plane of rotation of said element, whereby said idler is rotated by travel of said chain thereabout.

17. In a material-handling apparatus for use in animal husbandry and of the type having a continuous circuit, a conveyor therefor comprising an open top trough merging into a direction-changing housing, a pulley mounted in said housing on a substantially vertical axis, a kink-proof chain extending along said trough and through said housing about said pulley, and material-engaging flights on said chain and extending downwardly and substantially transversely from the longitudinal axis of said chain substantially to contact the lower edge thereof with the bottom of said trough and housing, said pulley having spaced chain-engaging portions with clearances between said portions which are substantially greater than the width of said flights, said chain within said housing being in engagement with said chain-engaging portions of said pulley with said flights travelling about the said pulley in the plane of rotation of said pulley, and driving means for said conveyor comprising a driving sprocket having a shaft mounted for rotation on a substantially horizontal axis and overlying and extending across the direction of travel of said chain and operatively associated with said chain for advancing it and said flights along said trough and through said housing.

18. The apparatus of claim 17 wherein the pulley for guiding the path of travel of the chain includes a rotatable substantially disc-like element, said element being mounted on an axis arranged substantially perpendicular to a plane parallel to the plane of the travel of said chain, and a spaced array of pins adjacent to but spaced from the periphery of said disc-like element, said pins extending normal to the plane of rotation of said element whereby said pulley is rotated by the travel of said chain thereabout.

19. The apparatus of claim 2 wherein the said paddles are mounted below the chain.

20. The apparatus of claim 2 which includes a paddle cleaner means adapted to scrape the paddles as they pass around said idler sprocket, said paddle cleaner means comprising paddle guide means below said sprocket adapted to hold the paddles in an extended array, a scraper head adapted to contact the leading face of each successive paddle and to move outwardly therealong, a support arm for said head swingable in a plane parallel to the plane of rotation of said idler sprocket, whereby said head travels outwardly along said paddle beyond the end thereof, and spring means for returning said head adjacent such chain to engage teh next succeeding paddle at a point near said chain.

21. The apparatus of claim 12 wherein said linear channels include a first upwardly extending linear channel and a second downwardly extending channel and means adjacent the upper end of said first and second channels adapted to change the direction of said conveyor in traveling through said linear and non-linear channels.

References Cited in the file of this patent

UNITED STATES PATENTS

| | | |
|---|---|---|
| 414,416 | Jennings | Nov. 5, 1889 |
| 709,149 | Grandjean et al. | Sept. 16, 1902 |
| 2,446,685 | Barker | Aug. 10, 1948 |
| 2,554,589 | Patz et al. | May 29, 1951 |
| 2,636,593 | Baehr | Apr. 28, 1953 |